United States Patent
Kim et al.

(10) Patent No.: US 11,011,311 B2
(45) Date of Patent: May 18, 2021

(54) MULTILAYER CAPACITOR

(71) Applicant: Samsung Electro-Mechanics Co., Ltd., Suwon-si (KR)

(72) Inventors: Je Jung Kim, Suwon-si (KR); Do Yeon Kim, Suwon-si (KR); Dong Yeong Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/275,800

(22) Filed: Feb. 14, 2019

(65) Prior Publication Data

US 2020/0043659 A1    Feb. 6, 2020

(30) Foreign Application Priority Data

Aug. 6, 2018  (KR) .......................... 10-2018-0091104

(51) Int. Cl.
*H01G 4/30* (2006.01)
*H01G 4/232* (2006.01)

(52) U.S. Cl.
CPC .............. *H01G 4/2325* (2013.01); *H01G 4/30* (2013.01)

(58) Field of Classification Search
CPC ......... H01G 4/30; H01G 4/232; H01G 4/2325
USPC ............ 361/306.3, 301.4, 303, 306.1, 321.1, 361/321.2, 321.3
See application file for complete search history.

(56) References Cited

U.S. PATENT DOCUMENTS

| | | | |
|---|---|---|---|
| 2012/0327557 A1* | 12/2012 | Ahn | H01G 4/30 361/321.3 |
| 2013/0220696 A1 | 8/2013 | Otani | |
| 2013/0242457 A1* | 9/2013 | Lee | H01G 4/008 361/301.4 |
| 2015/0170786 A1 | 6/2015 | Hong et al. | |

FOREIGN PATENT DOCUMENTS

| | | |
|---|---|---|
| JP | 5477476 B2 | 4/2014 |
| KR | 10-2015-0068622 A | 6/2016 |

* cited by examiner

*Primary Examiner* — Arun Ramaswamy
(74) *Attorney, Agent, or Firm* — Morgan, Lewis & Bockius LLP

(57) ABSTRACT

A multilayer capacitor includes a capacitor body including a multilayer structure of a dielectric layer and a plurality of internal electrodes; and an external electrode including a conductive layer and a conductive resin layer covering the conductive layer. The conductive layer includes an inner connecting portion disposed on a surface of the capacitor body and connected to the internal electrodes, and an inner band portion extending from the inner connecting portion to a portion of a mounting surface of the capacitor body. The conductive resin layer includes an outer connecting portion disposed on the inner connecting portion, and an outer band portion extending from the outer connecting portion to a portion of the mounting surface and covering the inner band portion. A ratio of a length of the inner band portion to a length of the outer band portion is 0.3 to 0.7.

11 Claims, 3 Drawing Sheets

MULTILAYER CAPACITOR

CROSS-REFERENCE TO RELATED APPLICATION

This application claims the benefit of 35 U.S.C. § 119(a) of Korean Patent Application No. 10-2018-0091104 filed on Aug. 6, 2018 in the Korean Intellectual Property Office, the entire disclosure of which is incorporated herein by reference for all purposes.

TECHNICAL FIELD

The following description relates to a multilayer capacitor.

BACKGROUND

Multilayer capacitors have positive characteristics in terms of miniaturization and implementing high capacity, while having ease of mounting. Thus, multilayer capacitors may be mounted on the circuit boards of various types of electronic products, including display devices such as a liquid crystal display (LCD), a plasma display panel (PDP) or the like, computers, smartphones and mobile phones, serving to charge or discharge electricity.

As the miniaturization, slimming, and multifunctionalization of electronic products have increased, the miniaturization of multilayer capacitors is required. Further, as such multilayer capacitors are mounted in a highly integrated manner, spaces between mounted multilayer capacitors are further reduced.

In addition, as industry interest in electric components has increased, multilayer capacitors having high reliability and high strength properties for use in automotive or infotainment systems have been demanded.

In recent years, since high flexural strength characteristics are required for chip components, a new method of improving flexural strength characteristics of a multilayer capacitor is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer capacitor having improved bending strength characteristics.

According to an aspect of the present disclosure, a multilayer capacitor may include a capacitor body containing a multilayer structure in which a dielectric layer and a plurality of internal electrodes are laminated, and an external electrode including a conductive layer disposed on an end of the capacitor body and connected to the plurality of internal electrodes, and a conductive resin layer covering the conductive layer. The conductive layer may include an inner connecting portion disposed on a surface of the capacitor body and connected to the plurality of internal electrodes, and an inner band portion extending from the inner connecting portion to a portion of a mounting surface of the capacitor body. The conductive resin layer may include an outer connecting portion disposed on the inner connecting portion, and an outer band portion extending from the outer connecting portion to a portion of the mounting surface of the capacitor body and covering the inner band portion. A ratio of a length of the inner band portion to a length of the outer band portion may be 0.3 to 0.7.

The capacitor body may have first and second surfaces opposing each other, and third and fourth surfaces connected to the first and second surfaces and opposing each other, and may include a plurality of dielectric layers, and a plurality of internal electrodes disposed with the dielectric layer interposed therebetween, and one ends of the plurality of internal electrodes are alternately exposed through the third and fourth surfaces of the capacitor body.

The external electrode may further include a plating layer covering the conductive resin layer.

The plating layer may include a nickel plating layer covering the conductive resin layer, and a tin plating layer covering the nickel plating layer.

A ratio of a length-direction margin, which is a length from an end of one of the plurality of internal electrodes to the surface which another of the plurality of internal electrodes is exposed to, of the capacitor body to the length of the outer band portion may be 0.2 to 0.9.

Other features and aspects will be apparent from the following detailed description, the drawings, and the claims.

BRIEF DESCRIPTION OF DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
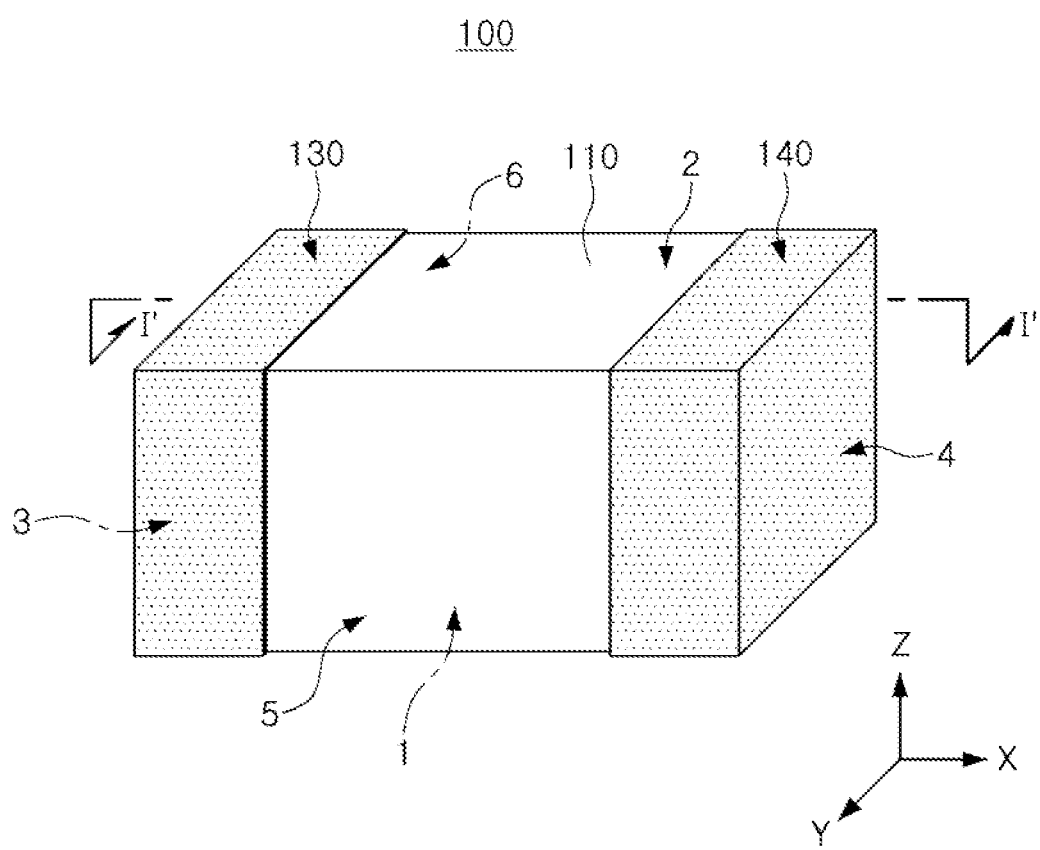
FIG. 1 is a perspective view schematically illustrating an example of a multilayer capacitor.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after gaining an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have merely been provided to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. As used herein, the term "and/or" includes any one and any combination of any two or more of the associated listed items. The articles "a," "an," and "the" are intended to include the plural forms as well, unless the context clearly indicates otherwise.

The use of the term "may" with respect to an example or embodiment, e.g., as to what an example or embodiment may include or implement, means that at least one example or embodiment exists in which such a feature is included or implemented while all examples and embodiments are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower," relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

Hereinafter, when the direction of a capacitor body 110 is defined to clearly explain embodiments of the present disclosure, X, Y and Z shown in the drawings represent the length direction, the width direction and the thickness direction of the capacitor body 110, respectively. Further, in examples described below, the Z direction may be used in the same concept as the lamination direction in which dielectric layers are laminated.

Figure 2A:
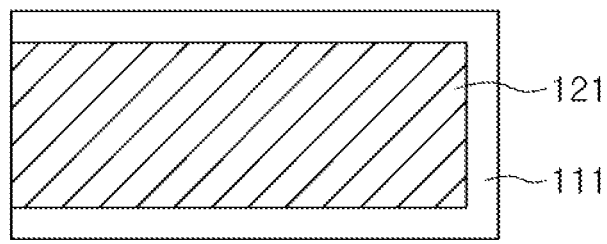
FIGS. 2A and 2B are plan views respectively illustrating first and second internal electrodes applied to the multilayer capacitor of FIG. 1.
Figure 2B:
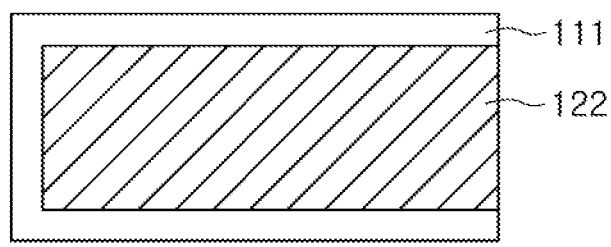
Figure 3:
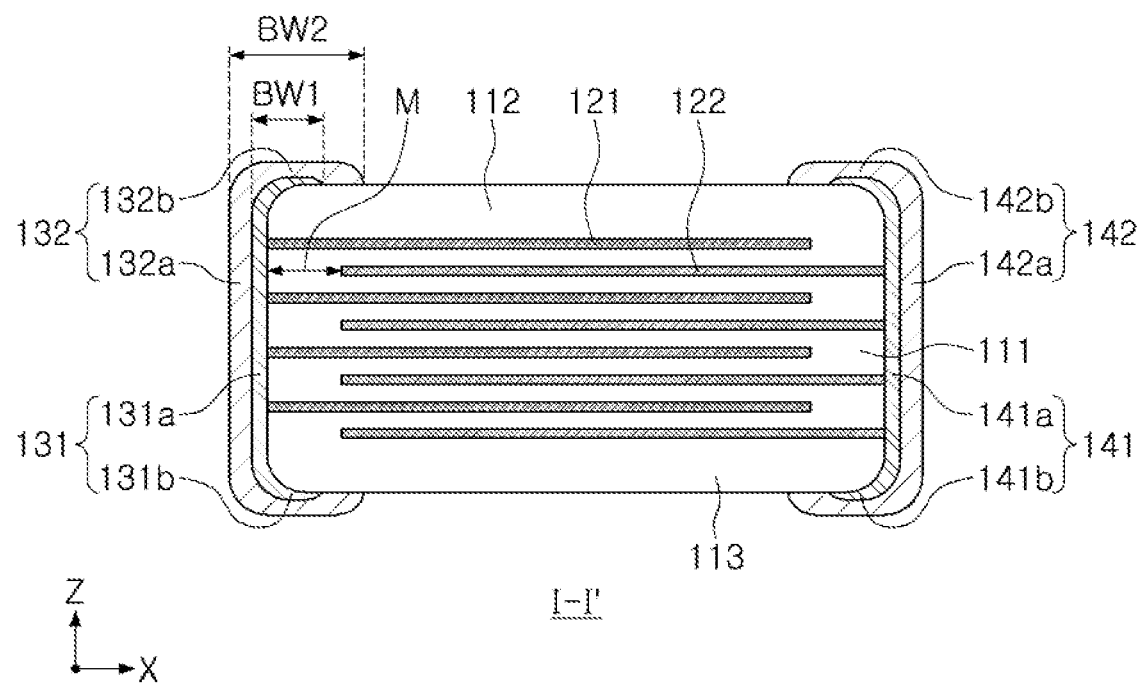
FIG. 3 is a cross-sectional view taken along line I-I' of FIG. 1.

FIG. 1 is a perspective view schematically illustrating an example of a multilayer capacitor, FIGS. 2A and 2B are plan views illustrating first and second internal electrodes respectively applied to the multilayer capacitor of FIG. 1, and FIG. 3 is a cross-sectional view taken along line I-I' in FIG. 1.

Referring to FIGS. 1 to 3, a multilayer capacitor 100 according to an example includes a capacitor body 110 and first and second external electrodes 130 and 140.

The capacitor body 110 is formed by laminating a plurality of dielectric layers 111 in a Z direction to be sintered. In this case, the plurality of dielectric layers 111 may be integrated such that it may be difficult to confirm a boundary between adjacent dielectric layers 111 without using a scanning electron microscope (SEM).

In this case, the capacitor body 110 may have a substantially hexahedral shape, but the shape thereof is not limited thereto. The shape and dimension of the capacitor body 110 and the number of laminated layers of the dielectric layers 111 are not limited to those shown in the drawings.

In this example, for convenience of explanation, both surfaces of the capacitor body 110 opposing each other in the Z direction are defined as first and second surfaces 1 and 2, and both surfaces thereof opposing each other in an X direction and connected to the first and second surfaces 1 and 2 are defined as third and fourth surfaces 3 and 4, and both surfaces thereof connected to the first and second surfaces and connected to the third and fourth surfaces and opposing each other in a Y direction are defined as fifth and sixth surfaces 5 and 6, respectively. Also, in this example, a mounting surface of the multilayer capacitor 100 may be the first surface 1 of the capacitor body 110.

The dielectric layer 111 may include a ceramic material having a high dielectric constant, for example, a barium titanate ($BaTiO_3$)-based or strontium titanate ($SrTiO_3$)-based ceramic powder, or the like, but the ceramic material is not limited thereto. For example, any ceramic material may be used as long as sufficient capacitance may be obtained therefrom.

A ceramic additive, an organic solvent, a plasticizer, a binder, a dispersant and the like may further be added to the dielectric layer 111, together with the ceramic powder.

The ceramic additive may be, for example, a transition metal oxide or a transition metal carbide, a rare earth element, magnesium (Mg), aluminum (Al), or the like.

The capacitor body 110 may be configured to include an active region serving as a portion contributing to capacitance formation of a capacitor, and upper and lower cover layers 112 and 113 formed on upper and lower portions of the active region in the Z direction, respectively, as upper and lower margin portions.

The upper and lower cover layers 112 and 113 may have the same material and configuration as those of the dielectric layer 111, except that the upper and lower cover layers 112 and 113 do not include internal electrodes.

The upper and lower cover layers 112 and 113 may be formed by laminating a single dielectric layer or two or more dielectric layers on the upper and lower surfaces of the active region in the Z direction, respectively. The upper and lower cover layers 112 and 113 may basically serve to prevent the first and second internal electrodes 121 and 122 from being damaged by physical or chemical stress.

The first and second internal electrodes 121 and 122 are electrodes having different polarities applied thereto, and are alternately disposed in the Z direction with the dielectric layer 111 interposed therebetween. One ends of the first and second internal electrodes 121 and 122 are exposed to the third and fourth surfaces 3 and 4 of the capacitor body 110, respectively.

In this case, the first and second internal electrodes 121 and 122 are electrically insulated from each other by the dielectric layer 111 interposed therebetween.

End portions of the first and second internal electrodes 121 and 122 alternately exposed through the third and fourth surfaces 3 and 4 of the capacitor body 110 are electrically connected to the first and second external electrodes 130 and 140 disposed on the third and fourth surfaces 3 and 4, respectively, to be described below.

In the configuration described above, when a predetermined voltage is applied to the first and second external electrodes 130 and 140, charges are accumulated between the first and second internal electrodes 121 and 122.

In this case, capacitance of the multilayer capacitor 100 is proportional to an area of overlap of the first and second internal electrodes 121 and 122 overlapping each other in the Z direction in the active region.

A material for the formation of the first and second internal electrodes 121 and 122 is not particularly limited. For example, the first and second internal electrodes 121 and 122 may be formed using a conductive paste formed of one or more materials among nickel (Ni) and copper (Cu) and a noble metal material such as platinum (Pt), palladium (Pd), a palladium-silver (Pd—Ag) alloy or the like.

In this case, the conductive paste may be printed by a screen printing method, a gravure printing method, or the like, but an example thereof is not limited thereto.

Voltages of different polarities are provided to the first and second external electrodes 130 and 140. The first and second external electrodes 130 and 140 are disposed on both ends of the capacitor body 110 in the X direction, to be in contact with the exposed portions of the first and second internal electrodes 121 and 122 to be electrically connected thereto, respectively.

The first and second external electrodes 130 and 140 include first and second conductive layers 131 and 141 formed on surfaces of the capacitor body 110 to be connected to the first and second internal electrodes 121 and 122, and first and second conductive resin layers 132 and 142 covering the first and second conductive layers 131 and 141, respectively.

The first conductive layer 131 may include a first inner connecting portion 131a and a first inner band portion 131b.

The first inner connecting portion 131a is a portion formed on the third surface 3 of the capacitor body 110 to be connected to the first internal electrode 121. The first inner band portion 131b is a portion extending from the first inner connecting portion 131a to a portion of the first surface 1 of the capacitor body 110.

In this case, the first inner band portion 131b may extend further to portions of the fifth and sixth surfaces 5 and 6 of the capacitor body 110 and a portion of the second surface 2, to improve fixing strength or the like.

The second conductive layer 141 may include a second inner connecting portion 141a and a second inner band portion 141b.

The second inner connecting portion 141a is provided as a portion formed on the fourth surface 4 of the capacitor body 110 to be connected to the second internal electrode 122, and the second inner band portion 141b is provided as a portion extending from the second inner connecting portion 141a to a portion of the first surface 1 of the capacitor body 110.

In this case, the second inner band portion 141b may further extend to portions of the fifth and sixth surfaces 5 and 6 of the capacitor body 110 and a portion of the second surface 2 of the capacitor body 110, to improve fixing strength or the like.

The first and second conductive layers 131 and 141 may include at least one of nickel (Ni), copper (Cu), and silver (Ag), and may further include glass.

The first conductive resin layer 132 may include a first outer connecting portion 132a and a first outer band portion 132b.

The first outer connecting portion 132a may cover the first inner connecting portion 131a, and the first outer band portion 132b extends to a portion of the first surface 1 of the capacitor body 110, while covering the first inner band portion 131b.

In this case, the first outer band portion 132b may extend further to portions of the fifth and sixth surfaces 5 and 6 of the capacitor body 110 and a portion of the second surface 2 thereof, depending on the structure of the first inner band portion 131b.

The second conductive resin layer 142 may include a second outer connecting portion 142a and a second outer band portion 142b.

The second outer connection portion 142a covers the second inner connecting portion 141a, and the second outer band portion 142b extends to a portion of the first surface 1 of the capacitor body 110, while covering the second inner band portion 141b.

In this case, the second outer band portion 142b may extend further to portions of the fifth and sixth surfaces 5 and 6 of the capacitor body 110 and a portion of the second surface 2 thereof, depending on the structure of the second inner band portion 141b.

The first and second conductive resin layers 132 and 142 provide a stress absorbing effect, and may include a conductive metal, an epoxy and the like. In this case, the conductive metal may be copper or nickel.

Lengths of the first and second inner band portions 131b and 141b of the first and second conductive layers 131 and 141 are set to be smaller than those of the first and second outer band portions 132b and 142b of the first and second conductive resin layers 132 and 142, respectively.

In this case, a ratio of lengths BW1 of the first and second inner band portions 131b and 141b in the length direction to lengths BW2 of the first and second outer band portions 132b and 142b in the length direction may be 0.3 to 0.7, respectively.

For example, when a length margin of the capacitor body 110 in the length direction is M, the ratio of an X-directional margin of the capacitor body 110 to a length BW2 of each of the first and second outer band portions 132b and 142b in the length direction is 0.2 to 0.9.

Figure 4:
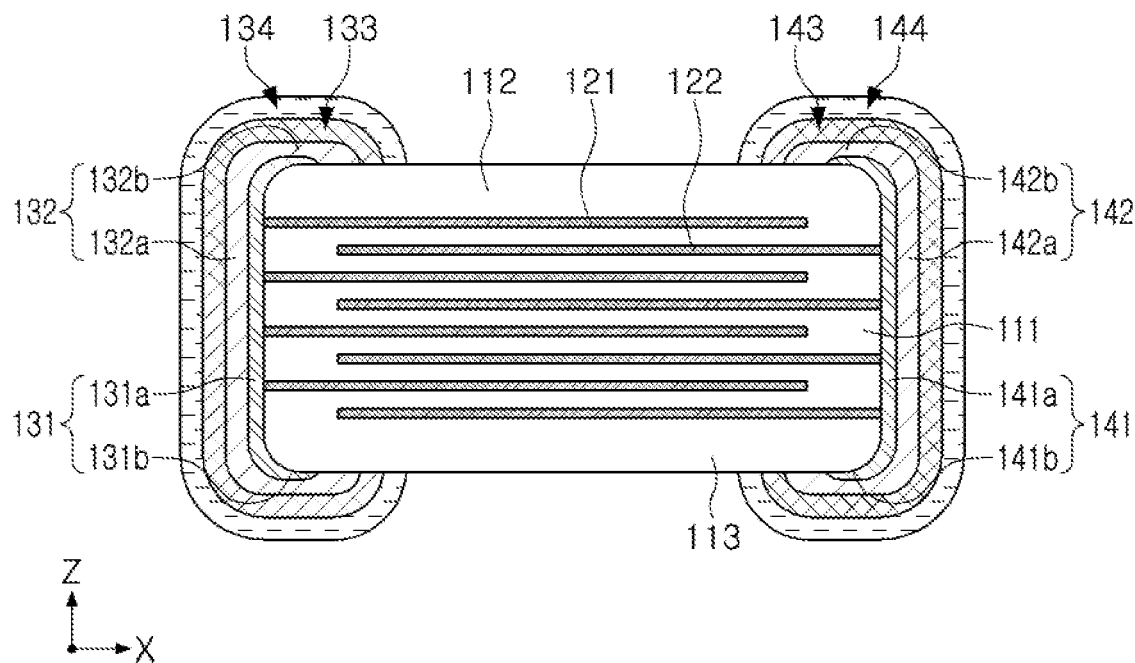
FIG. 4 is a cross-sectional view illustrating that a plating layer is additionally formed in FIG. 3.

Referring to FIG. 4, the first and second external electrodes 130 and 140 may further include a plating layer formed to cover the first and second conductive resin layers 132 and 142.

The plating layer includes first and second nickel (Ni) plating layers 133 and 143 covering the first and second conductive resin layers 132 and 142, respectively, and first and second tin (Sn) plating layers 134 and 144 covering the first and second nickel plating layers 133 and 143, respectively.

In the case of the multilayer capacitor mounted on the substrate, for example, in the case in which the substrate is bent, the multilayer capacitor mounted on the substrate has a pressing depth, an h value, which is increased away from a central portion thereof subjected to pressing force, and the stress applied thereto also increases.

Thus, the size of the multilayer capacitor increases, bending stress received by an end portion of the multilayer capacitor increases.

To provide an effect of absorbing bending stress, a structure is provided, in which, when an external electrode is formed, a primary electrode is formed of a conductive material on a capacitor body, and a secondary electrode is formed thereon using a conductive resin.

In the case of the related art, a multilayer capacitor is manufactured in such a manner that a secondary electrode may have a longest band length as possible.

However, recently, it has been confirmed that a position of a primary electrode as well as a secondary electrode affects bending strength of a multilayer capacitor.

Thus, in an example of the present disclosure, positions of ends of the first and second conductive layers 131 and 141 corresponding to a primary electrode, with respect to positions of the first and second conductive resin layers 132 and 142 corresponding to a secondary electrode, are adjusted, thereby improving bending strength.

In the case of the capacitor body 110, in a case in which stress occurs, cracks may occur in portions of the capacitor body 110 in which energy is concentrated, to propagate. In the case of the multilayer capacitor according to an example of the present disclosure, in which the first and second conductive resin layers 132 and 142 are included in the first and second external electrodes 130 and 140, respectively, ends of the first and second inner band portions 131b and 141b of the first and second conductive layers 131 and 132 may be points at which such cracks occur.

Thus, the lengths of the first and second inner band portions 131b and 132b of the first and second conductive layers 131 and 141 are reduced in such a manner that ends of the first and second inner band portions 131b and 132b are located relatively closer to the third and fourth surfaces 3 and 4 of the capacitor body 110 in the X direction. In this case, a relatively large amount of stress is transferred to the first and second conductive resin layers 132 and 142. Since only a portion of the first and second conductive resin layers 132 and 142 is removed, not the entirety of the first and second external electrodes 130 and 140, thereby improving crack prevention effect.

In this example, in a state in which the first and second conductive resin layers 132 and 142 completely cover the first and second conductive layers 131 and 141, the lengths of the first and second inner band portions 131b and 141b are set to be minimum lengths in a state covered by the first and second outer band portions 132b and 142b. Thus, concentration of stress generated at the ends of the first and second inner band portions 131b and 141b may be significantly reduced, thereby improving bending strength characteristics.

In this case, when the length of the first or second inner band portion 131b or 141b of the first or second conductive layer 131 or 141 in the X direction is defined as BW1 and the length of the first or second outer band portion 132b or 142b of the first or second conductive resin layer 132 or 142 in the X direction is defined as BW2, BW1/BW2 may be 0.3 to 0.7.

EXPERIMENTAL EXAMPLE

Table 1 shows the frequency of the occurrence of bending cracks of a capacitor body depending on a change in BW1/BW2 in FIG. 3.

In this case, a multilayer capacitor was manufactured to have a length of 32 mm, a width of 16 mm, and electrical characteristics of 4.7 uF.

The frequency of the occurrence of bending cracks was measured by locating the multilayer capacitor mounted on a substrate in a device capable of applying pressure to a mounting surface of the multilayer capacitor and by applying pressure downwardly on a surface of the multilayer capacitor opposite to the mounting surface to cause deflections of 4 mm, 5 mm, 6 mm, 7 mm and 8 mm, as shown in Table 1, until a current value is increased to determine whether or not bending cracking occurs.

TABLE 1

| # | BW1/BW2 | Frequency of Occurrence of Cracks | | | | |
|---|---|---|---|---|---|---|
| | | 4 mm | 5 mm | 6 mm | 7 mm | 8 mm |
| 1 | 0.1 | 0/60 | 0/60 | 0/60 | 0/60 | 0/60 |
| 2 | 0.2 | 0/60 | 0/60 | 0/60 | 0/60 | 0/60 |
| 3 | 0.3 | 0/60 | 0/60 | 0/60 | 0/60 | 1/60 |
| 4 | 0.5 | 0/60 | 0/60 | 0/60 | 0/60 | 2/60 |
| 5 | 0.6 | 0/60 | 0/60 | 0/60 | 1/60 | 3/60 |
| 6 | 0.7 | 0/60 | 0/60 | 1/60 | 2/60 | 2/60 |
| 7 | 0.8 | 1/60 | 2/60 | 2/60 | 3/60 | 4/60 |
| 8 | 0.9 | 2/60 | 1/60 | 3/60 | 5/60 | 4/60 |

Referring to Table 1, it can be confirmed that samples 1 to 6, having a BW1/BW2 of 0.1 to 0.7, do not cause defects such as cracking at a pressing depth of 5 mm or less, and thus, bending strength may be guaranteed.

In the case of samples 7 and 8 having a BW1/BW2 of 0.8 and 0.9, respectively, cracks occurred even at a pressing depth of 4 mm and thus bending strength could not be guaranteed. In Sample 8, it can be confirmed that a conductive layer was excessively coated, and cracks thus occurred relatively most seriously.

Table 2 below shows test results with respect to moisture resistance reliability of multilayer capacitors, based on changes in BW1/BW2, at 85° C. and 85% for 48 hours. Samples of the multilayer capacitors were manufactured by the same method as that in Table 1.

In Table 2 below, A, B, C, D and E are distinguished to confirm distribution between lots.

TABLE 2

| # | BW1/BW2 | Frequency of Occurrence of Defect in Moisture Resistance Reliability | | | | |
|---|---|---|---|---|---|---|
| | | A | B | C | D | E |
| 1 | 0.1 | 0/400 | 2/400 | 4/400 | 1/400 | 3/400 |
| 2 | 0.2 | 0/400 | 1/400 | 2/400 | 0/400 | 2/400 |
| 3 | 0.3 | 0/400 | 0/400 | 0/400 | 0/400 | 0/400 |
| 4 | 0.5 | 0/400 | 0/400 | 0/400 | 0/400 | 0/400 |
| 5 | 0.6 | 0/400 | 0/400 | 0/400 | 0/400 | 0/400 |
| 6 | 0.7 | 0/400 | 0/400 | 0/400 | 0/400 | 0/400 |
| 7 | 0.8 | 0/400 | 0/400 | 0/400 | 0/400 | 0/400 |
| 8 | 0.9 | 0/400 | 0/400 | 0/400 | 0/400 | 0/400 |

With reference to Table 2, it can be seen that samples 1 and 2, having a BW1/BW2 of 0.2 or less, do not cause defects such as cracking at all pressing depths, and may thus guarantee bending strength, but the moisture resistance reliability is bad.

Thus, in this example, it can be seen that a numerical range of BW1/BW2, in which moisture resistance reliability may be secured while ensuring bending strength, is 0.3 to 0.6.

Table 3 shows the frequency of the occurrence of cracks and the frequency of the occurrence of moisture resistance reliability defects, depending on changes in the ratio of a margin M in an X direction to BW2 in FIG. 3, for example, M/BW2.

TABLE 3

| # | M/BW2 | Frequency of Occurrence of Cracks | | | | | Frequency of Occurrence of Moisture Resistance Defects |
|---|---|---|---|---|---|---|---|
| | | 3 mm | 4 mm | 5 mm | 6 mm | 7 mm | |
| 9 | 0.15 | 0/60 | 0/60 | 0/60 | 0/60 | 0/60 | 6/400 |
| 10 | 0.2 | 0/60 | 0/60 | 0/60 | 0/60 | 0/60 | 0/400 |
| 11 | 0.4 | 0/60 | 0/60 | 0/60 | 1/60 | 1/60 | 0/400 |
| 12 | 0.6 | 0/60 | 0/60 | 0/60 | 1/60 | 1/60 | 0/400 |
| 13 | 0.8 | 0/60 | 0/60 | 0/60 | 1/60 | 3/60 | 0/400 |
| 14 | 0.9 | 0/60 | 0/60 | 0/60 | 2/60 | 2/60 | 0/400 |
| 15 | 1.0 | 0/60 | 0/60 | 1/60 | 2/60 | 3/60 | 0/400 |
| 16 | 1.2 | 0/60 | 0/60 | 2/60 | 2/60 | 4/60 | 0/400 |
| 17 | 1.4 | 0/60 | 1/60 | 1/60 | 3/60 | 4/60 | 0/400 |

Referring to Table 3, it can be seen that Samples 9 to 14, having M/BW2 of 0.15 to 0.9, do not cause defects such as cracking at a pressing depth of 5 mm or less, and thus, bending strength may be guaranteed.

Further, it can be seen that Samples 15 to 17, having M/BW2 of more than 0.9, have defects such as cracking at a pressing depth of 5 mm, and thus, bending strength is not guaranteed.

On the other hand, in the case of Sample 9 having M/BW2 of 0.15, defects such as cracking did not occur at all pressing depths, but moisture resistance reliability defects occurred.

Thus, it can be seen that the numerical range of M/BW2, in which bending strength may be guaranteed and moisture resistance reliability may be secured, is 0.2 to 0.9.

The multilayer capacitor disclosed herein may provide improved bending strength characteristics.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects of the present disclosure in each example are to be considered as being applicable to similar features or aspects of the present disclosure in other examples. Suitable results may be achieved if the described techniques are performed in a different order, and/or if components in a device are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer capacitor comprising:
a capacitor body including a multilayer structure in which a dielectric layer and a plurality of internal electrodes are laminated; and
an external electrode including a conductive layer disposed on an end of the capacitor body and connected to the plurality of internal electrodes, and a conductive resin layer covering the conductive layer,
wherein the conductive layer includes an inner connecting portion disposed on a surface of the capacitor body and connected to the plurality of internal electrodes, and an inner band portion extending from the inner connecting portion to a portion of a mounting surface of the capacitor body,
the conductive resin layer includes an outer connecting portion disposed on the inner connecting portion, and an outer band portion extending from the outer connecting portion to a portion of the mounting surface of the capacitor body and covering the inner band portion,
a ratio of a length of the inner band portion to a length of the outer band portion is 0.3 to 0.7,
a ratio of a length-direction margin, which is a length from an end of one of the plurality of internal electrodes to the surface which another of the plurality of internal electrodes is exposed to, of the capacitor body to the length of the outer band portion of the conductive resin layer is 0.2 to 0.9, and
the length from the end of the one of the plurality of internal electrodes to the surface which another of the plurality of internal electrodes is exposed to is substantially the same as a length from an end of the another of the plurality of internal electrodes to a surface which the one of the plurality of internal electrodes is exposed to.

2. The multilayer capacitor of claim 1, wherein the capacitor body has first and second surfaces opposing each other, and third and fourth surfaces connected to the first and second surfaces and opposing each other, the capacitor body including a plurality of dielectric layers, and a plurality of internal electrodes disposed with the dielectric layer interposed therebetween, and
one ends of the plurality of internal electrodes are alternately exposed through the third and fourth surfaces of the capacitor body.

3. The multilayer capacitor of claim 1, wherein the external electrode further includes a plating layer covering the conductive resin layer.

4. The multilayer capacitor of claim 3, wherein the plating layer comprises a nickel plating layer covering the conductive resin layer, and a tin plating layer covering the nickel plating layer.

5. The multilayer capacitor of claim 1, wherein the external electrode comprises first and second external electrodes respectively disposed on opposing ends of the capacitor body,
the internal electrodes are alternately exposed to surfaces of the capacitor body opposing each other in a length direction,
the length of the inner band portion is measured in the length direction between opposing outermost points of the conductive layer in the length direction, the length of the outer band portion is measured in the length direction between opposing outermost points of the conductive resin layer in the length direction, and the ratio of the length of the inner band portion to the length of the outer band portion is 0.3 to 0.7.

6. A multilayer capacitor comprising:
a capacitor body including a multilayer structure in which a dielectric layer and a plurality of internal electrodes are laminated; and
first and second external electrodes each including a conductive layer disposed on a respective end of the capacitor body and connected to respective internal electrodes of the plurality of internal electrodes, and a conductive resin layer covering the conductive layer,
wherein each conductive layer includes an inner connecting portion disposed on a respective surface of the capacitor body and connected to respective internal electrodes, and an inner band portion extending from the inner connecting portion to a portion of a mounting surface of the capacitor body, each conductive resin layer includes an outer connecting portion disposed on the respective inner connecting portion, and an outer band portion extending from the respective outer connecting portion to a portion of the mounting surface of the capacitor body and covering the respective inner band portion, a ratio of a length of each inner band portion to a length of each outer band portion is 0.3 to 0.7, a ratio of each length-direction margin, which is a length from an end of one of the plurality of internal electrodes to the surface which another of the plurality of internal electrodes is exposed to, of the capacitor body to the length of each outer band portion of the conductive resin layer is 0.2 to 0.9, and the length from the end of the one of the plurality of internal electrodes to the surface which another of the plurality of internal electrodes is exposed to is substantially the same as a length from an end of the another of the plurality of internal electrodes to a surface which the one of the plurality of internal electrodes is exposed to.

7. The multilayer capacitor of claim 6, wherein the capacitor body has first and second surfaces opposing each other, and third and fourth surfaces connected to the first and second surfaces and opposing each other, the capacitor body including a plurality of dielectric layers, and a plurality of internal electrodes disposed with the dielectric layer interposed therebetween, and one ends of the plurality of internal electrodes are alternately exposed through the third and fourth surfaces of the capacitor body.

8. The multilayer capacitor of claim 6, wherein each external electrode further includes a plating layer covering the respective conductive resin layer.

9. The multilayer capacitor of claim 8, wherein each plating layer comprises a nickel plating layer covering the respective conductive resin layer, and a tin plating layer covering the respective nickel plating layer.

10. The multilayer capacitor of claim 6, wherein each of a first length-direction margin, which is a length from an end of one of the plurality of internal electrodes to the surface which the inner connecting portion of the conductive layer of the first external electrode, and a second length-direction margin, which is a length from an end of one of the plurality of internal electrodes to the surface which the inner connecting portion of the conductive layer of the second external electrode, satisfy the ratio the length-direction margin of the capacitor body to the length of each outer band portion of the conductive resin layer is 0.2 to 0.9.

11. The multilayer capacitor of claim 6, wherein the internal electrodes are alternately exposed to surfaces of the capacitor body opposing each other in a length direction, the length of each inner band portion is measured in the length direction between opposing outermost points of the respective conductive layer in the length direction, the length of each outer band portion is measured in the length direction between opposing outermost points of the respective conductive resin layer in the length direction, and the ratio of the length of each inner band portion to the length of each outer band portion is 0.3 to 0.7.

* * * * *